US006690729B2

(12) United States Patent
Hayashi (10) Patent No.: US 6,690,729 B2
(45) Date of Patent: Feb. 10, 2004

(54) MOTION VECTOR SEARCH APPARATUS AND METHOD

(75) Inventor: Naoya Hayashi, Tokyo (JP)

(73) Assignee: NEC Electronics Corporation (JP)

( * ) Notice: Subject to any disclaimer, the term of this patent is extended or adjusted under 35 U.S.C. 154(b) by 254 days.

(21) Appl. No.: 09/731,370

(22) Filed: Dec. 6, 2000

(65) Prior Publication Data

US 2001/0002922 A1 Jun. 7, 2001

(30) Foreign Application Priority Data

Dec. 7, 1999 (JP) .......................... 11-348159

(51) Int. Cl.[7] .......................... H04N 7/12; H04N 11/02; H04N 11/04
(52) U.S. Cl. .......................... 375/240.16; 375/240.16
(58) Field of Search .................. 375/240.02, 240.03, 375/240.12, 240.16, 240.24, 240.25, 240.29; 348/699; H04N 7/12, 11/02, 11/04

(56) References Cited

U.S. PATENT DOCUMENTS

| 5,036,393 | A | * | 7/1991 | Samad et al. ................. 348/452 |
| 5,657,087 | A | * | 8/1997 | Jeong et al. ............ 375/240.16 |
| 5,929,917 | A | * | 7/1999 | Kim ........................ 375/240.24 |
| 6,023,300 | A | * | 2/2000 | Han et al. ............... 375/240.16 |
| 6,256,343 | B1 | * | 7/2001 | Suzuki ......................... 375/240 |
| 6,348,954 | B1 | * | 2/2002 | Takishima et al. ........... 348/699 |
| 6,385,245 | B1 | * | 5/2002 | De Haan et al. ......... 375/240.16 |

FOREIGN PATENT DOCUMENTS

| JP | 08-149481 | 7/1996 | ............ H04N/7/32 |
| JP | 09-070046 | 11/1997 | ............ H04N/7/32 |

OTHER PUBLICATIONS

Mizuno et al, "Adaptive Search—Windw Motion Estimation for MPEG–2 Encoder LSIs", Technical Report of IEICE, ICD97–163 (1997–10).

* cited by examiner

Primary Examiner—Nhon Diep
(74) Attorney, Agent, or Firm—Hayes Soloway P.C.

(57) ABSTRACT

The object of the present invention is to realize a motion vector search apparatus and method that is able to perform highly accurate motion vector searching even in images containing discontinuous motion relative to encoded images immediately before. According to the present invention, global motion vector search unit searches for a global motion vector by evaluating differences between pixels at the same location of an input image and an NR reference image in the form of an input image input one frame earlier that is held in original image memory. CPU then determines the motion vector search area based on the results of this global motion vector search, and sets that range in motion vector search unit. Motion vector search unit then searches for and determines a motion vector from previously encoded reference images held in frame memory that are the same as the encoded image held in frame memory over the motion vector search area set by CPU.

22 Claims, 6 Drawing Sheets

MOTION VECTOR SEARCH APPARATUS AND METHOD

BACKGROUND OF THE INVENTION

1. Field of the Invention

The present invention relates to a video encoding apparatus, and more particularly, to a motion vector search apparatus and method suitably used for searching for motion vectors of macroblocks comprising an image of the video.

The present specification is based on a patent application filed in Japan (Japanese Patent Application No. 11-348159), and the contents described in said Japanese patent application are incorporated as a portion of the present specification.

2. Description of the Related Art

A broad range of video encoding technology, which is used to compress the amount of data of videos, has been used practically, ranging from that used for video telephones and teleconferencing, to that used for recording and accumulating digital videos. ITU-T H.261 and MPEG1, MPEG2 standards are among these video encoding technologies. They use the motion compensated prediction which encodes differences between a block of an image to be encoded and a reference block pointed by a motion vector.

A known example of a motion vector search apparatus of the prior art is the apparatus described in "Histogram-Adaptive Motion Vector Searching and its Hardware Implementation in an MPEG-2 Encoding LSI" in Shingaku Giho ICD97-163.

Figure 9:
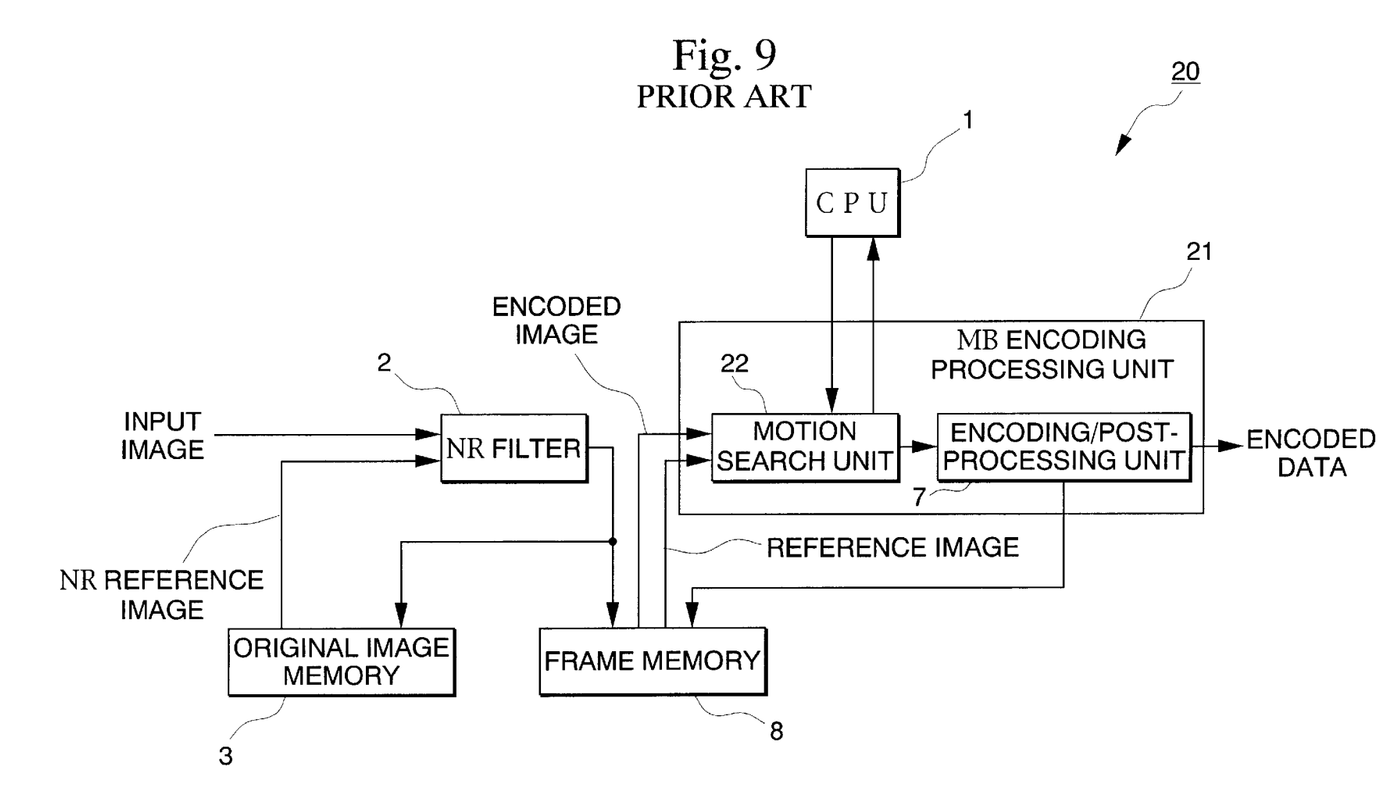
FIG. 9 is a block diagram showing the configuration of video encoding apparatus of the prior art.

FIG. 9 is a block diagram showing the configuration of video encoding apparatus 20 that uses this motion vector search apparatus of the prior art. In this drawing, video encoding apparatus 20 is composed of CPU 1, inter-frame noise reduction filter (abbreviated as NR filter) 2, original image memory 3, macroblock encoding processing unit (abbreviated as MB encoding processing unit) 21, and frame memory 8. MB encoding processing unit 21 is composed of motion vector search unit 22 and encoding/post-processing unit 7.

Motion vector searching of the prior art is performed according to the processing described below by CPU 1, MB encoding processing unit 21 and frame memory 8.

To begin with, the output of NR filter 2 retained in frame memory 8 is input to motion vector search unit 22 as a current macroblock (16×16 pixels) of an image to be encoded. Next, a reference area of a reference image that is referred to when searching for motion vectors (to be referred to as the motion vector search area) is input from frame memory 8 to motion vector search unit 22. This reference image is "an image that was encoded and restored by encoding/post-processing unit 7 in order to provide prediction blocks. As a result of then comparing the input current macroblock and the reference area by motion vector search unit 22 and CPU 1, motion vector of the current macroblock is detected. Although the quality of encoded images can be improved with a wider motion vector search range, a huge amount of calculations are required. Consequently, various methods have been examined for searching for motion vectors that reduce the amount of calculations, and in this example of the prior art, this is performed by adaptively changing the size and location of the search area using the histogram of detected motion vectors of previously encoded images.

Furthermore, although the video encoding apparatus 20 of the prior art shown in the above-mentioned FIG. 9 employs a configuration wherein original image memory 3 and frame memory 8 are each provided separately, a configuration in which original image memory 3 and frame memory 8 are integrated into a single frame memory is normally performed in the prior art.

In the above-mentioned motion vector search apparatus of the prior art, the location and the shape of the motion vector search area is adaptively changed using the histogram of detected motion vectors of previously encoded images. The histogram refers to the motion vectors of the higher occurrences or the average of the motion vectors detected for each macroblock of the encoded image immediately before. Therefore, in the case of images in which motion is discontinuous with respect to previous images, such as momentary images at which motion just starts, or momentary images at which motion has just stopped, the motion vector search area determined on the basis of the histogram of previously detected motion vectors differs from actual motion of the encoded image. Thereby arises the problem that high accuracy motion vector searching is not always able to be attained. As a result, image quality degrades, and the quality of succeeding images using this degraded image as a reference image also end up deteriorating.

SUMMARY OF THE INVENTION

The object of the present invention is to provide a motion vector search apparatus and method that is able to set the motion vector search area that matches the actual motion of the current image, thereby allowing motion vector searching to be performed that demonstrates high accuracy at all times, even for images in which motion is discontinuous with respect to the previous images.

The present invention is equipped with a global motion vector search unit, which detects a global motion vector of a current input image over a predetermined range on a screen by evaluating differences between an input image one frame earlier and a current input image for said predetermined range; a motion vector search area determination unit, which sets the search areas of macroblock motion vectors that are motion vectors for each macroblock of an image to be encoded, based on said global motion vector; and, a motion vector search unit that determines said macroblock motion vectors by comparing each macroblock of the image to be encoded with said search areas of a reference image.

In addition, the present invention is equipped with a global motion vector search unit, which detects a global motion vector of a predetermined range on a screen by evaluating differences between an input image one frame earlier and a current input image for said predetermined range; a motion vector search area determination unit, which sets the search areas of macroblock motion vectors that are motion vectors for each macroblock, based on said global motion vectors that have been determined for each of a plurality of input images in the case a plurality of images are present between the image to be encoded and a reference image that is referred to during encoding said image to be encoded; and, a motion vector search unit that determines said macroblock motion vectors by comparing each macroblock of said image to be encoded with said search areas of said reference image.

Preferably, said global motion vector search unit determines said global motion vector by evaluating the differences between a portion of said input image one frame earlier and a portion of said current input image. Both portions of those images can be decimated.

In addition, said motion vector search area determination unit preferably sets one or both of the center and shape of said search area based on results of searching said global motion vector.

In addition, the present invention is preferably additionally equipped with an inter-frame noise reduction filter that attenuates noise contained in said input image before said input image is input to said global motion vector search unit.

In addition, the present invention detects said global motion vector by evaluating differences between an input image one frame earlier and a current input image for said predetermined range; setting the search areas of macroblock motion vectors, based on said global motion vector; and, comparing each macroblock of said image to be encoded with said search areas of said reference image.

In addition, the present invention detects said global motion vector by evaluating differences between an input image one frame earlier and a current input image for said predetermined range; setting the search areas of macroblock motion vectors, based on said global motion vectors that have been determined for each of a plurality of input images in the case a plurality of frames are present between said image to be encoded and a reference image that is referred to during encoding said image to be encoded; and, comparing each macroblock of said image to be encoded with said search areas of said reference image.

According to the present invention, a motion vector search area can be determined that matches the actual motion of the image to be encoded, and highly accurate motion vector searching can be performed at all times even for images in which motion is discontinuous with respect to the encoded image immediately before.

Moreover, since said global motion vector search unit determines said global motion vector by evaluating differences between a portion of said input image one frame earlier and a portion of said current input image and both portions of these images can be decimated, the amount of calculations and the amount of data transfer for searching for a global motion vector can be reduced.

Moreover, since images referred to by an inter-frame noise reduction filter are used as input images of the previous frame referred to in global motion vector searching, it is not necessary to provide additional frame memory for retaining image data of the previous frame, and not necessary to transfer additional data for global motion vector searching.

Furthermore, since this summary of the present invention does not list all necessary characteristics, sub-combinations of this group of characteristics are also included in the present invention.

DETAILED DESCRIPTION OF THE PREFERRED EMBODIMENTS

The following embodiments do not limit the invention described in the claims. In addition, not all of the combinations of characteristics explained in the embodiments are necessarily required in order to achieve the object of the present invention.

The following provides an explanation of one embodiment of the present invention with reference to the drawings.

Figure 1:
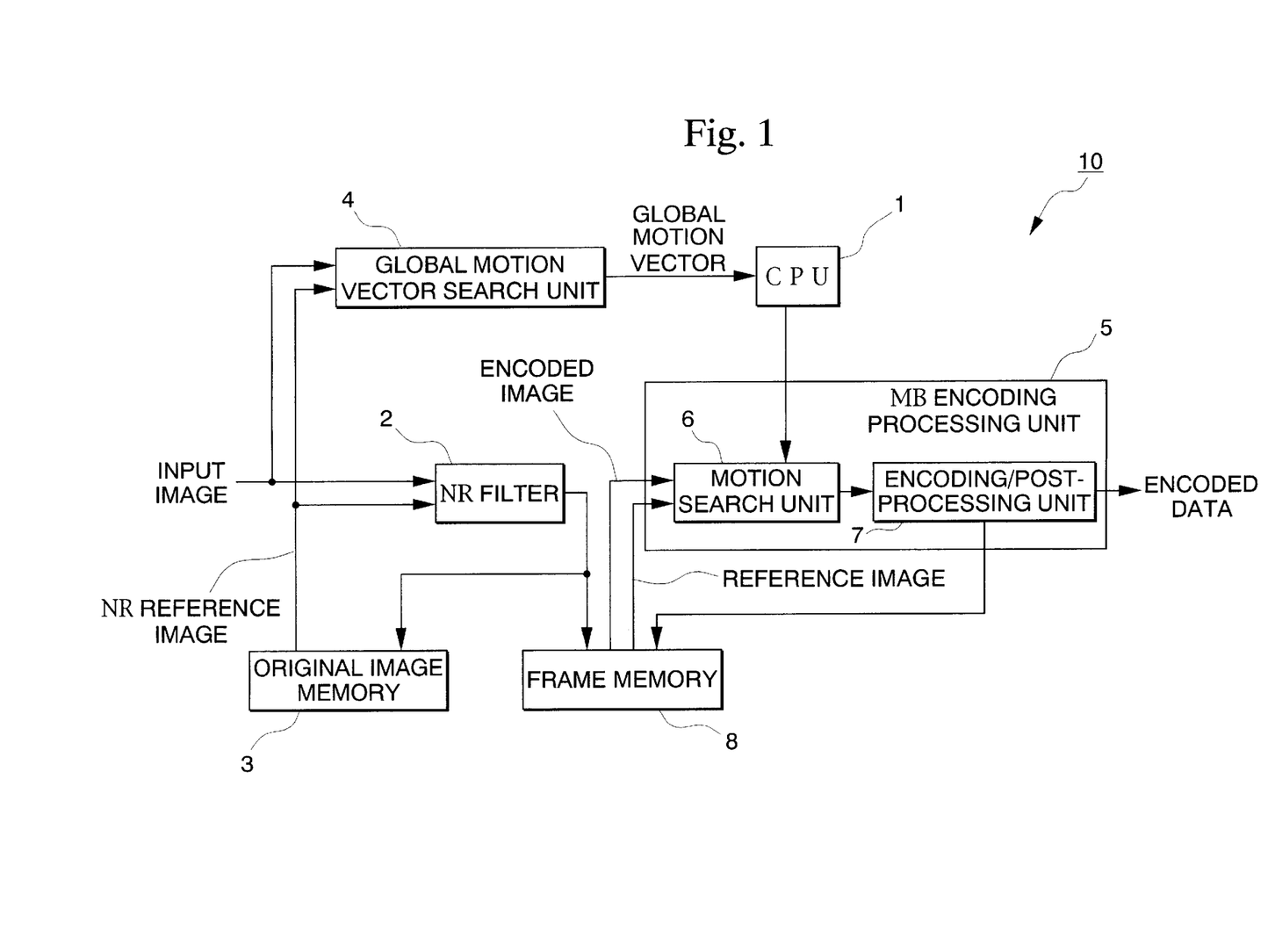
FIG. 1 is a block diagram showing the configuration of video encoding apparatus according to one embodiment of the present invention.

FIG. 1 is a block drawing showing the configuration of video encoding apparatus 10 according to one embodiment of the present invention. In this drawing, reference numeral 1 indicates a CPU (central processing unit) that performs overall control of video encoding apparatus. Reference numeral 2 is an inter-frame noise reduction filter (abbreviated as NR filter) that attenuates noise contained in input images. Reference numeral 3 is an original image memory that temporarily retains the previous input image (to be referred to as the NR reference image). The output of NR filter 2 is retained in frame memory 8 in the form of the target image of encoding (to be referred to as the current image). Reference numeral 4 is a global motion vector search unit that searches for a global motion vector, which indicates motion of a large part of image by comparing the input image and the NR reference image. CPU 1 sets the motion vector search area according to the results of this global motion vector search.

Reference numeral 5 is a macroblock (abbreviated as MB) encoding processing unit that encodes images in MB units, and is composed of motion vector search unit 6 and encoding/post-processing unit 7. Motion vector search unit 6 searches for and determines motion vectors of MBs in the current images retained in frame memory 8 in the motion vector search areas set by CPU1 on previously encoded images (to be referred to as reference images) also retained in frame memory 8. Encoding/post-processing unit 7 encodes the MB data together with MB motion vectors in the case of inter-frame prediction. In addition, encoding/post-processing unit 7 generates a reference image by decoding and restoring the encoded data and retains that reference image in frame memory 8. The reference image retained in frame memory 8 is used for processing of following encoded images.

Furthermore, the signals connected to CPU 1 are only shown in FIG. 1 for those signals relating to motion vector searching.

Figure 2:
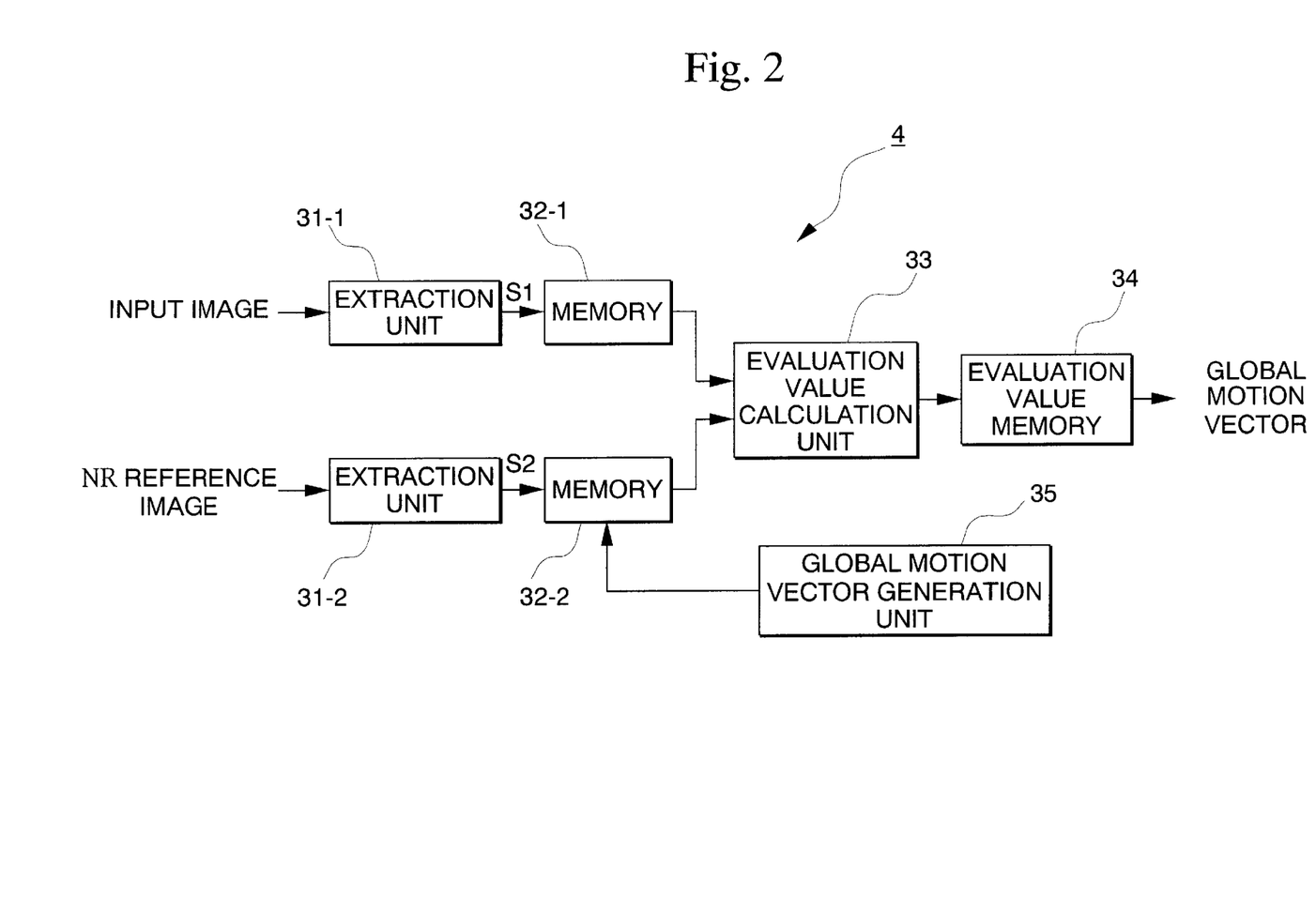
FIG. 2 is a block diagram showing the configuration of global motion vector search unit 4 in FIG. 1.

FIG. 2 is a block diagram showing the configuration of global motion vector search unit 4 shown in FIG. 1. Global motion vector search unit 4 searches for global motion vectors at the accuracy of a coarse global motion. Extraction unit 31-1 extracts and decimates pixels used for global motion vector searching from input images, and retains these extracted pixels in memory 32-1 in the form of search images SI for global motion vector searching. Furthermore, in order to prevent aliasing noise that occurs due to decimation, a low-band pass filter that attenuates the high-frequency components that cause this aliasing noise may be provided upstream from extraction unit 31-1 if necessary.

Similarly, extraction unit 31-2 extracts and decimates pixels that are used for global motion vector searching from the NR reference image which is the input image of the previous frame, and retains those pixels in memory 32-2 in the form of search reference images S2 that are referred to in global motion vector searching. Furthermore, in order to prevent aliasing noise that occurs due to decimation, a low-band pass filter that attenuates the high-frequency components that cause this aliasing noise may similarly be provided upstream from extraction unit 31-2 if necessary.

In addition, global motion vector generation unit 35 generates all global motion vectors based on a predetermined search accuracy and global motion vector search range, and reads those search reference images corresponding to said global motion vectors from memory 32-2. Evaluation value calculation unit 33 determines for all pixels differences between search reference images S2 read from memory 32-2 and search images S1 retained in memory 32-1 for each global motion vector generated by global motion vector generation unit 35, and retains the sum of the absolute values of these differences in evaluation value memory 34 in the form of evaluation values of those global motion vectors. The smaller the evaluation value, the better the evaluation, and indicates that the global motion vectors agree with overall screen motion. Furthermore, instead of the sum of the absolute values of the above differences, the sum of the squares of those differences may also be used for the evaluation values of global motion vectors.

CPU 1 determines "an area that contains those global motion vectors having good evaluation values and which is narrower than the entire motion vector search range" centering on the global motion vector having the best evaluation value for the search area of the macroblock motion vector, and sets that area in motion vector search unit 6. Highly precise motion vector searching on the order of, for example, 1 pixel or 0.5 pixels is performed over this set macroblock motion vector search area.

Furthermore, as was previously described, instead of evaluation value calculation unit 33 determining the evaluation value of a global motion vector from the sum of the differences of all pixels on the screen, it may also calculate the evaluation values of global motion vectors for each partial region after dividing the input image and NR reference image into a plurality of partial regions. Moreover, evaluation values of global motion vectors may also be calculated by, for example, extracting those divided partial regions near the center, and treating those extracted regions as representative partial regions. In these cases, if motion of the images is localized and not unidirectional, CPU 1 may set the macroblock motion vector search area for MBs near some partial region where motion is different from other partial regions separately based on the evaluation values of the global motion vectors of the partial region.

Figure 3A:
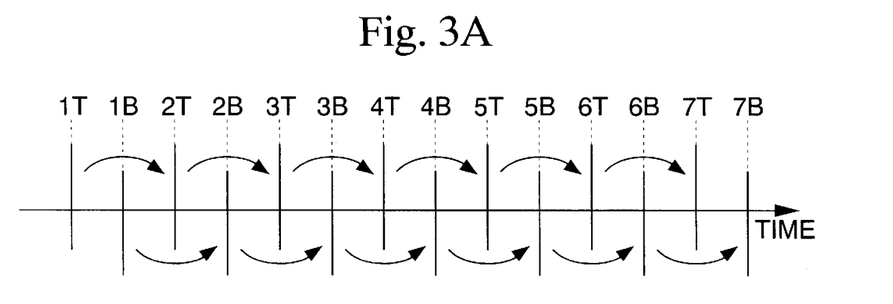
FIGS. 3A through 3C are drawings for explaining the motion vector search operation by the video encoding apparatus of FIG. 1.

Next, a detailed explanation is provided of the operation for determining the macroblock vector search area according to the above-mentioned embodiment with reference to FIGS. 3A through 8D. FIG. 3A is a drawing showing the reference relationship of NR reference images, while FIGS. 3B and 3C are drawings showing the reference relationship of encoded images during macroblock motion vector searching. FIGS. 4 through 8D are drawings for explaining the operation for determining the macroblock motion vector search area.

Figure 3B:
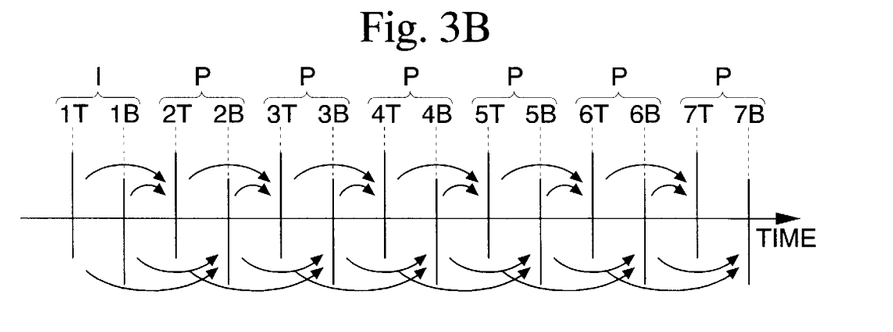
Figure 3C:
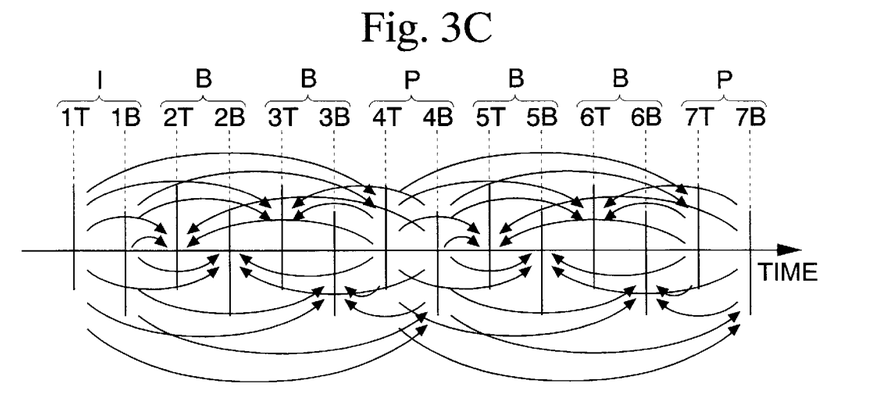

Here, an explanation is provided regarding the symbols shown in FIGS. 3A through 3C. The horizontal axes in these drawings indicates the passage of time, and time passes moving to the right in the drawing. In addition, 1T through 7T indicate input images of each odd field of the first through seventh input frames, while 1B through 7B indicate input images of each even field of the first through seventh input frames. Symbols I, P and B shown in FIGS. 3B and 3C relate to the picture coding types defined in MPEG1 and MPEG2 standards. Although MPEG2 encoding may involve the cases of frame structure or field structure, here an explanation is provided using as an example the case of frame structure.

One of these picture coding types is referred to as the I picture, that is encoded in the form of a still picture without referring to other images. This I picture is indicated with symbol I. Another of these picture coding types is referred to as the P picture, that is encoded with reference to the most recent I picture or P picture to the past direction. This P picture is indicated with symbol P. The other type is referred to as the B picture, that is encoded with reference to the most recent I pictures or P pictures to both the past and future directions. This B picture is indicated with symbol B. In the case of FIG. 3B, the first frame (1T and 1B) is an I picture, while the second to seventh frames are P pictures. In addition, in the case of FIG. 3C, the first frame (1T and 1B) is an I picture, the fourth and seventh frames are P pictures, and the second, third, fifth and sixth frames are B pictures.

The picture interval between an I picture and P picture or between two P pictures is indicated as M. Thus, in the case the number of B pictures is 0 as in FIG. 3B, the value of M is 1, while in the case the number of pictures located between an I picture and P picture or between two P pictures is 2 as in FIG. 3C, the value of M is 3. Henceforth, encoding in the case of M=1 will be referred to as M=1 encoding, while encoding in the case of M=3 will be referred to as M=3 encoding.

In addition, arrows indicate the reference relationship of each image, with the image at the starting point of each arrow being the reference image of the image at the end point. Although the reference relationship is 1:1 in FIG. 3A, FIGS. 3B and 3C show a plurality of images referring to a single image.

Furthermore, the value of M is set in advance according to the purpose of encoding. For example, M=1 is used in cases requiring rapid response such as teleconferencing. In addition, M=3 is used in cases of recording images onto DVD (Digital Versatile Disks) and other media.

To begin with, an explanation is provided of the reference relationship between an input image input to NR filter 2 and an NR reference image with reference to FIG. 3A. NR filter 2 detects the respective differences in luminance and chrominance signals of pixels at the same location between the input image and NR reference image, treats pixels as being still when the differences are small, and processes pixels so that the luminance and chrominance signals of pixels of the input image approach the luminance and chrominance signals of pixels of the NR reference image. On the other hand, NR filter 2 treats pixels as moving when the above differences are large, and outputs those luminance and chrominance signals of the pixels of the input image directly. Consequently, the odd field of the previous frame is referred to the odd field of the input frame and the even field of the previous frame is referred to the even field of the input frame. In FIG. 3A, for example, the NR reference image for odd field 2T of the second input frame is odd field 1T of the first input frame. The NR reference image for even field 2T of the second input frame is odd field 1B of the first input frame. The relationship between the input image and NR reference image input to NR filter 2 is shown below.

The NR reference image for input image (n+1)T is nT, and the NR reference image for input image (n+1)B is n nB;

where, n is an integer. Furthermore, the output image of NR filter 2 is normally used for the NR reference image of the next input image.

As previously mentioned, global motion vector search unit 4 generates search reference image S2 from the NR reference image. Thus, the reference relationship between search image S1 and search reference image S2 is equivalent to the relationship between the input image and NR reference image input to NR filter 2. Namely, in the case the input image is (n+1)T, global motion vector searching is performed with reference to nT while on the other hand, in the case the input image is (n+1)B, global motion vector searching is performed with reference to nB.

Next, an explanation is provided of the relationship of the reference image used by motion vector search unit 6 when searching for macroblock motion vectors. FIG. 3B shows the reference relationship in the case of M=1 encoding. As shown in this drawing, the odd and even fields of the previous frame are the reference images for P pictures. For example, the reference images for odd field 2T or even field 2B of the second input frame are both odd field 1T and even field 1B of the first input frame. The reference relationship for these P pictures is shown below.

The references images for fields (n+1) T or (n+1)B of a P picture are nT and nB;

where, n is an integer.

As has been described above, the reference relationship in global motion vector searching is such that the reference image is nT in the case the input image is (n+1)T, and nB in the case the input image is (n+1)B. Thus, in the case of M=1 encoding, the frame of the reference image for P pictures and the frame of the NR reference image in global motion vector searching is the same previous frame. This means that "the global motion vector indicates the coarse motion vector of MBs in P pictures", and that CPU 1 should set the search area of the macroblock motion vector based on this global motion vector.

Furthermore, to be more precise, a global motion vector is only determined for one reference image of the two odd and even reference fields that are referred to by a P picture. However, although each global motion vector is not determined for the other reference field, namely the reference image of the even field referred to by the odd field of the P picture and the odd field that is referred to by the even field of the P picture, there is normally no problem even if the same global motion vector is used due to the continuity of the video.

Figure 4:
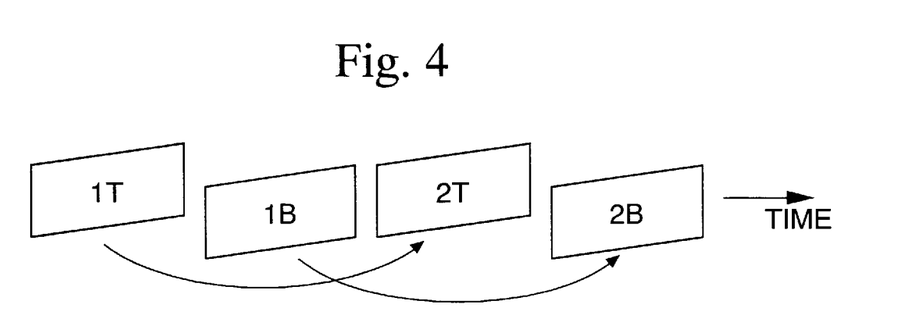
FIG. 4 is a first drawing for explaining the operation for determining the motion vector search area in the case of M=1 encoding according to FIG. 3B.

Next, an explanation is provided of an example of the operation by CPU 1 which determines the search area of the macroblock motion vector in the case of M=1 encoding with reference to FIGS. 4 through 8. FIG. 4 indicates that, as was previously mentioned with reference to FIG. 3A, the NR reference image for odd field 2T is odd field 1T, and that the NR reference image for even field 2B is even field 1B.

To begin with, an explanation is provided of the case of odd field 2T being input to video encoding apparatus 10. In this case, an input image in the form of odd field 2T and an NR reference image in the form of odd field 1T are respectively input to global motion vector search unit 4. Pixels of the input odd field 2T are extracted and decimated by extraction unit 31-1, and retained in memory 32-1 in the form of search image S1. In addition, the pixels of input odd field 1T are extracted and decimated by extraction unit 31-2, and retained in memory 32-2 in the form of search image S2.

Moreover, the address corresponding to the global motion vector is input to memory 32-2 by global motion vector generation unit 35. In this example, in the case the global motion vector searching conditions are a range of 16 pixels in the horizontal and vertical directions and an accuracy of 8 pixels, the number of global motion vectors generated by global motion vector generation unit 35 is 25 at the coordinates indicated below.

Global motion vector coordinates: (8x,8y)

where, x is an integer from −2 to +2, and y is an integer from −2 to +2.

In addition, x is "+" when moving right from the center, and "−" when moving left from the center.

In addition, y is "−" when moving down from the center, and when moving up from the center.

Figure 5A:
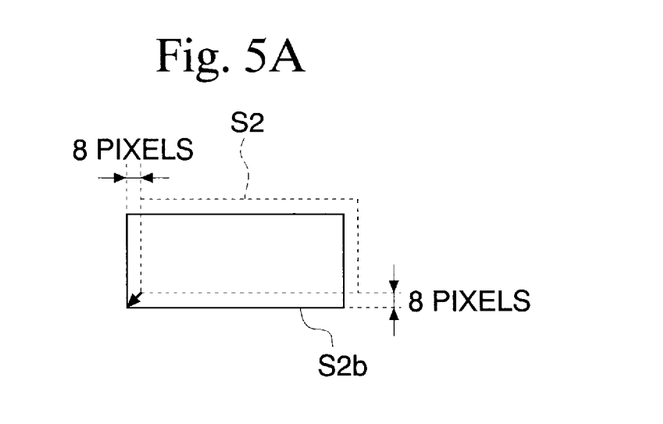
FIGS. 5A and 5B are second drawings for explaining the operation for determining the motion vector search area in the case of M=1 encoding according to FIG. 3B.
Figure 5B:
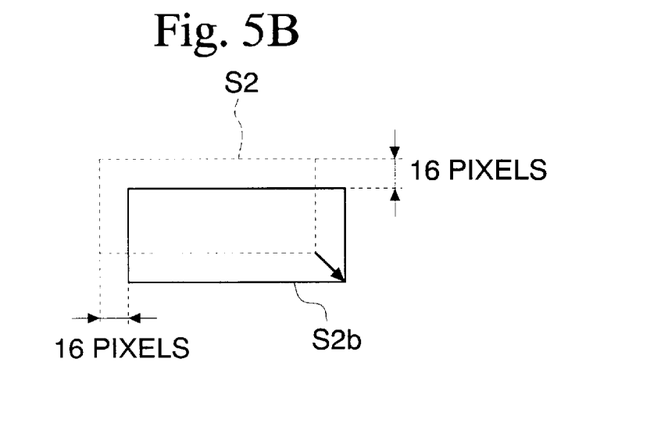

Next, evaluation value calculation unit 33 calculates evaluation values for each of these 25 global motion vectors and stores them in evaluation value memory 34. FIGS. 5A and 5B are drawings for explaining the operation for calculating the evaluation values of global motion vectors. FIG. 5A shows the case of the coordinates of the global motion vectors being (−8,+8). In this drawing, S2, indicated with broken lines, is the region at the same location as extracted input image S1. Evaluation value calculation unit 33 respectively detects the differences between each pixel of reference image S2a, that is located in 8 pixels to the left and 8 pixels down, as pointed by the global motion vector coordinates (−8, +8), from the location of search image S1, and those pixels of search image S1. The absolute values of the difference of each pixel determined in this manner are then totaled and the resulting sum is used as the global motion vector evaluation value at the coordinates (−8,+8). FIG. 5B is a drawing in the case the global motion vector coordinates are (+16,+16). Similarly, the difference of each pixel is determined between reference image S2, which is located in 16 pixels to the right and 16 pixels down, and search image S1, and the sum of the absolute values of these differences is then used as the evaluation value. Thus, the smaller the sum of the absolute values of these differences, the better the evaluation value. In addition, since the reference image is shifted by a maximum of 16 pixels in the horizontal and vertical directions, the input image must occupy a small region of at least 16 pixels at the upper, lower, left and right edges.

Figures 6A, 6B, 7A:
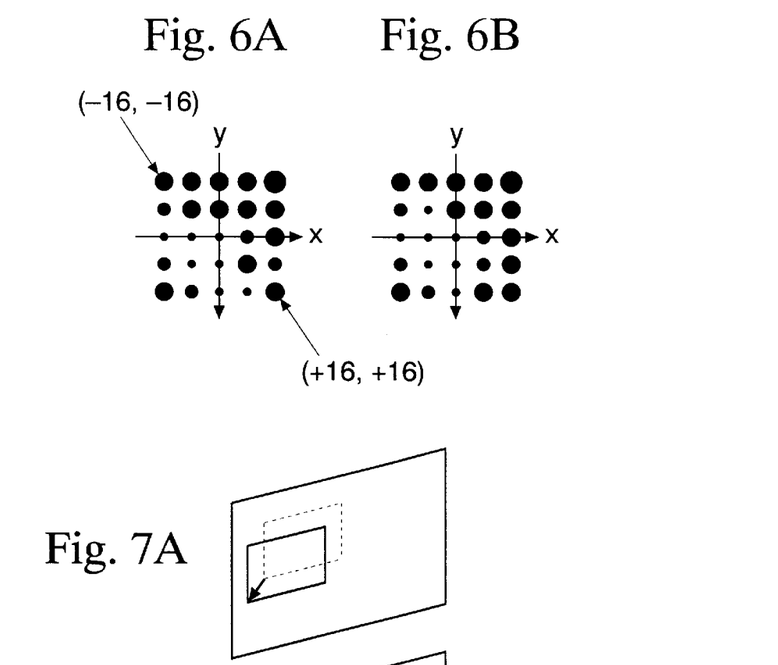
FIGS. 6a and 6B are third drawings for explaining the operation for determining the motion vector search area in the case of M=1 encoding according to FIG. 3B.
FIGS. 7A and 7B are fourth drawings for explaining the operation for determining the motion vector search area in the case of M=1 encoding according to FIG. 3B.

FIGS. 6A and 6B are two-dimensional drawings showing each of the global motion vector evaluation values determined in this manner. In FIGS. 6A and 6B, the locations of the black dots on the x-y coordinates indicate each global motion vector coordinate, and the area of each black dot represents the evaluation value of that global motion vector. The smaller the area of the black dot, the better the evaluation value. FIG. 6A shows the evaluation values of each global motion vector searched and determined between odd field 2T of the input frame and odd field 1T of the NR reference image. In addition, FIG. 6B shows the evaluation values of each global motion vector searched and determined between even field 2B of the input frame and even field 1B of the NR reference image. In FIG. 6A, the areas of the black dots at coordinates (−16,00), (−8,0), (0,0), (−8,+8), (0,+8), (0,+16) and (+8,+16) are small, indicating that the evaluation values of these global motion vectors are good. In addition, in FIG. 6B, the areas of the black dots at coordinates (−8,−8), (−16,0), (−8,0), (0,0), (−8,+8), (0,+8) and (0,+16) are small, indicating that the evaluation values of these global motion vectors are good. The evaluation value of the global motion vector at coordinates (−8,+8) was a very good value.

Figure 7B:
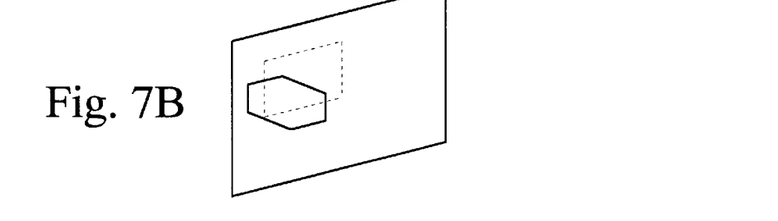

Next, FIGS. 7A and 7B are drawings for explaining the operation by CPU 1 which determines the macroblock motion vector search area based on the evaluation values of each global motion vector and sets that area in motion vector search unit 6. In addition, FIGS. 8A through 8D are drawings showing one example of the shape prepared in advance for use as the shape of this motion vector search area. The range surrounded by broken lines indicates the entire motion vector search range, while the range surrounded by solid lines indicates the area of the shape prepared in advance.

To begin with, as shown in FIG. 7A, CPU 1 shifts the motion vector search area from the area surrounded by broken lines to the area surrounded by solid lines (in the direction of the arrow) based on the evaluation values of FIGS. 6A and 6B. The direction and amount of this shift of the motion vector search area is selected so that the global motion vector at coordinates (−8,+8) having the best evaluation value among the evaluation values of FIGS. 6A and 6B lies at the center of the motion vector search area.

Figure 8A:
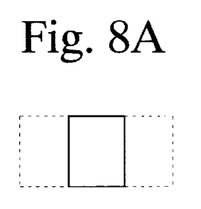
FIGS. 8A through 8D are fifth drawings for explaining the operation for determining the motion vector search area in the case of M=1 encoding according to FIG. 3B.
Figure 8B:
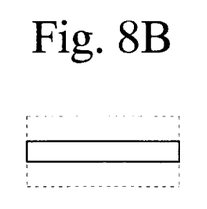
Figure 8C:
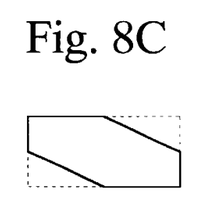
Figure 8D:
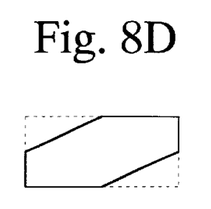

Moreover, as shown in FIG. 7B, CPU 1 may also change the shape of the motion vector search area to a narrower area from the area surrounded by broken lines to the area surrounded by solid lines according to the evaluation values of FIGS. 6A and 6B. In FIG. 7B, the shape shown in FIG. 8C is selected for the motion vector search area. This shape is selected so that the sum of the global motion search vector evaluation values contained in that shape is the smallest among the four types of shapes shown in FIGS. 8A through 8D. In this manner, changing the shape of the motion vector search area to a narrower area according to the global motion vector evaluation value is effective for reducing the amount of calculations required for motion vector searching.

The above has provided an explanation of the operation for determining the motion vector search area of macroblocks of the current images in the case of M=1 encoding. Furthermore, although the motion vector search area was set by separately determining the global motion vectors of odd fields and the global motion vectors of even fields in the example of this explanation, the results of global motion vector searches of odd and even fields may be integrated, and the motion vector search range may then be set based on this integrated global motion vector search result. For example, the combined global motion vector of both odd and even fields may be determined by averaging the evaluation value of odd fields and the evaluation value of even fields with respect to the same global motion vector, and the motion vector search area may then be set based on this combined global motion vector of the odd and even fields determined in this manner. Alternatively, the motion vector search area may also be set by adapting to the global motion vector of either the odd or even fields.

Next, an explanation is provided of the operation for determining the macroblock motion vector search area in the case of M>1 encoding in which M is 2 or more such as M=3. To begin with, an explanation is provided of the reference relationship in the case of M=3 encoding using B pictures with reference to FIG. 3C. As shown in this drawing, in the case of a P picture, the odd and even fields of the I picture or P picture three frames earlier are the reference images for the P picture. For example, the reference images for odd field 4T or even field 4B of the fourth input frame are odd field 1T and even field 1B of the first input frame for both. In addition, in the case of a B picture, the odd and even fields of the I picture or P picture on both past and future directions of the B picture are the reference images. For example, the reference images of odd field 2T or even field 2B of the second input frame are odd field 1T and even field 1B of the first input frame, and odd field 4T and even field 4B of the fourth input frame for both. The relationship of the reference images for each of these shown below.

The reference images for fields (n+3)T or (n+3)B of a P picture are nT and nB.

The reference images for fields (n+1)T or (n+1)B, or (n+2)T or (n+2)B of a B pictures are nT, nB, (n+3)T and (n+3)B;

where, n is an integer.

As previously mentioned, in the case of M=3 encoding, with the exception of referencing the adjacent frame in a B picture, the reference image for a current image differs from its NR reference image. Thus, the NR reference image for global motion vector searching and the reference image for macroblock motion vector searching are not the same image. In this manner, in the case of M>1 encoding, the NR reference image for global motion vector searching and the reference image for macroblock motion vector searching are different.

Therefore, the following provides an explanation of an example of the operation for determining the motion vector search area in the case of M>1 encoding. When determining the motion vector search area, the global motion vector which indicates the global motion between the current image and the reference image for macroblock motion vector searching is needed.

Consequently, in such cases, CPU 1 generates global motion vectors separately for odd fields of those images and even fields of those images by synthesizing all global motion vectors having the best evaluation values obtained for each input field between the reference image and the current image. Similar to the case of M=1 encoding as mentioned above, the motion vector search area is shifted so that these global motion vectors between the reference image and the current image lie at the center of the motion vector search area.

However, since the direction and amount of motion may change in the case of a long frame interval, if the motion vector search area is narrowed by changing the shape of the motion vector search area, there is the possibility of it not being possible to follow the global motion between the reference image and the current image. CPU 1 may change the shape of the motion vector search area in order to reduce the amount of calculations required for motion vector searching. In this case, for example, CPU 1 changes the shape of the motion vector search area to a narrower area so as to include global motion vectors having good evaluation values among those global motion vector evaluation values determined at the reference image closest to the current image. This change to a narrower area is performed by selecting, for example, from the four types of shapes shown in FIGS. 8A through 8D in the same manner as in the case of M=1 encoding previously described.

Furthermore, in the case of a B picture, motion vector searching is performed with future reference images, in this case, processing is performed by inverting the positive and negative signs of the global motion vectors.

The above has provided an explanation of the operation for determining the motion vector search area for macroblocks in the current image. Furthermore, although the motion vector search area was set by determining the global motion vectors of odd fields and the global motion vectors of even fields separately in the example explained for the case of M>1 encoding similar to the case of the above-mentioned M=1 encoding, the results of global motion vector searching of both odd and even fields may be synthesized, and the motion vector search area may then be set based on these synthesized global motion vector search results. For example, global motion vectors of both odd and even fields may be determined by averaging the evaluation values of odd fields and the evaluation values of even fields with respect to the same global motion vector, and the motion vector search area may be set based on these global motion vectors of odd and even fields determined in this manner. Alternatively, the motion vector search area may also be set by adapting to the global motion vector of either the odd or even fields in order to reduce the amount of calculations.

Thus, in the above-mentioned embodiment, global motion vectors are searched for based only on original image data by global motion vector search unit 4 equipped upstream from MB encoding processing unit 5. CPU 1 then determines the motion vector search area according to the global motion vector search results and sets that area in motion vector search unit 6. For this reason, even in the case of discontinuous motion, since the global motion vector search results indicate an appropriate motion vector search area based on the input image, thereby highly accurate motion vectors can be obtained for at all times. Thus, even if there is discontinuous motion in the current image with respect to the encoded image immediately before, encoding can be performed without any deterioration of image quality.

In addition, in the case of videos captured with panning, the direction of motion is frequently biased in one direction. In such cases, it is particularly effective in the above-mentioned embodiment to limit the motion vector search area to a narrow range according to the results of a global motion vector search. As a result, the amount of calculations required for motion vector searching can be reduced and therefore power consumption can be reduced without degrading image quality of the encoded videos.

Furthermore, in the above-mentioned embodiment, NR filter 2 is located farther upstream than the location of video encoding, and has been commonly used in the prior art to improve encoding efficiency by attenuating inter-frame noise. Thus, since the NR reference image can be used as the reference image that is referenced during global motion vector searching, there is also the effect of eliminating the need to provide an additional frame memory for retaining the input image of the previous frame or additional data transfer for the global vector searching.

Furthermore, as is shown in FIG. 1, although original image memory 3 and frame memory 8 were composed to be provided separately in the above-mentioned embodiment, original image memory 3 and frame memory 8 may also be composed in the form of a single frame memory as has been done in the past.

What is claimed is:

1. A motion vector search apparatus comprising:
   a global motion vector search unit, which determines a global motion vector which indicates global motion of a current input image by decimating an input image one frame earlier to form a search reference image, decimating said current input image to form a search image, and evaluating differences between the search image and the search reference image for a predetermined range;
   a motion vector search area determination unit, which determines a search area of macroblock motion vectors for macroblocks in a current image to be encoded, based on said global motion vector; and
   a motion vector search unit that determines said macroblock motion vector by comparing said macroblock in said current image with a block in said search area of a reference image that is referred to during encoding said current image.

2. A motion vector search apparatus according to claim 1, wherein said motion vector search area determination unit determines the a center of said search area based on said global motion vector.

3. A motion vector search apparatus according to claim 1, wherein said motion vector search area determination unit determines the a shape of said search area on the results of searching said global motion vector.

4. A motion vector search apparatus according to claim 1, wherein said motion vector search area determination unit determines a center and shape of said search area based on the results of searching said global motion vector.

5. A motion vector search apparatus according to claim 1, additionally comprising:
   an inter-frame noise reduction filter that attenuates noise in the same location of pixels of said current input image and said input image one frame earlier before said current input image is input to said global motion vector search unit.

6. A motion vector search apparatus comprising:
   a global motion vector search unit, which determines a global motion vector which indicates global motion of a current input image by evaluating differences between an input image one frame earlier and said current input image for a predetermined range;
   a motion vector search area determination unit, which determines a search area of macroblock motion vectors for macroblocks in a current image to be encoded, based on said global motion vectors that have been determined for each of a plurality of input images in the case a plurality of frames are present between said current image and a reference image that is referred to during encoding said current image; and
   a motion vector search unit that determines said macroblock motion vector by comparing said macroblock in said current image with a block in said search area of a reference image.

7. A motion vector search apparatus according to claim 6, wherein said global motion vector search unit determines said global motion vector by decimating said input image one frame earlier to form a search reference image, decimating said current input image to form a search image, and evaluating the differences between the search image and the search reference image.

8. A motion vector search apparatus according to claim 6, wherein said motion vector search area determination unit determines a center of said search area based on said global motion vector.

9. A motion vector search apparatus according to claim 6, wherein said motion vector search area determination unit determines a shape of said search area based on the results of searching said global motion vector.

10. A motion vector search apparatus according to claim 6, wherein said motion vector search area determination unit determines a center and shape of said search area based on the results of searching said global motion vector.

11. A motion vector search apparatus according to claim 6, additionally comprising:
    an inter-frame noise reduction filter that attenuates noise in the same location of pixels of said current input image and said input image one frame earlier before said current input image is input to said global motion vector search unit.

12. A motion vector search method comprising:

determining a global motion vector which indicates global motion of a current input image by decimating an input image one frame earlier to form a search reference image, decimating said current input image to form a search image, and evaluating differences between the search image and the search reference image for a predetermined range;

determining a search area of macroblock motion vectors for macroblocks in a current image to be encoded, based on said global motion vector; and, determining said macroblock motion vector by comparing said macroblock in said current image with a block in said search area of said reference image that is referred to during encoding said current image.

13. A motion vector search method comprising:

determining a global motion vector which indicates global motion of a current input image by evaluating differences between an input image one frame earlier and said current input image for a predetermined range;

determining a search area of macroblock motion vectors for macroblocks in a T current image to be encoded, based on said global motion vectors that have been determined for each of a plurality of input images in the case a plurality of frames are present between said current image and a reference image that is referred to during encoding said current image; and, determining said macroblock motion vector by comparing said macroblock in said current image with a block in said search area of said reference image.

14. A motion vector search apparatus comprising:

a global motion vector search unit, which determines a global motion vector which indicates global motion of a current input image by decimating an input image one frame earlier to form a search reference image, decimating said current input image to form a search image, and evaluating differences between the search image and the search reference image for a predetermined range; and a motion vector search area determination unit, which dynamically determines an area for determining a local motion vector, based on said global motion vector.

15. A motion vector search apparatus according to claim 1, wherein said global motion vector search area evaluates differences between the search image and the search reference image over global motion vector coordinates (mx,my) where m is a pixel accuracy and x and y are integers over respective ranges.

16. A motion vector search apparatus according to claim 1, wherein the global motion vector search unit produces evaluation values for each candidate global motion vector, said motion vector search area determination unit determining a shape of said search area by selecting a shape that minimizes a sum of evaluation values contained that shape.

17. A motion vector search apparatus according to claim 16, wherein the motion vector search area determination unit selects a shape that minimizes a sum of evaluation values contained in that shape from a plurality of predetermined shapes.

18. A motion vector search apparatus comprising:

a global motion vector search unit, which determines a plurality of candidate global motion vectors which indicate global motion of a current input image by evaluating differences between an input image one frame earlier and said current input image to calculation evaluation values;

a motion vector search area determination unit, which determines a search area and its shape of macroblock motion vectors for macro blocks in a current image to be encoded by selecting a search area and shape that minimizes a sum of evaluation values contained in that shape; and a motion vector search unit that determines said macroblock motion vector by comparing said macroblock in said current image with a block in said search area of a reference image that is referred to during encoding said current image.

19. A motion vector search apparatus according to claim 18, wherein the motion vector search area determination unit selects a shape that minimizes a sum of evaluation values contained in that shape from a plurality of predetermined shapes.

20. A motion vector search apparatus according to claim 18, wherein the global motion vector unit decimates the current input image to form a search image, decimates the input image one frame earlier to form a search reference image, and evaluates differences between the search image and search reference image to calculate the evaluation values.

21. A motion vector search apparatus according to claim 20, wherein said global motion vector search unit evaluates differences between the search image and the search reference image over global motion vector coordinates (mx,my) where m is a pixel accuracy and x and y are integers over respective ranges.

22. A motion vector search apparatus comprising:

a global motion vector search unit, which determines a global motion vector which indicates global motion of a current input image by evaluating differences between an input image one frame earlier and said current input image for a predetermined range;

a motion vector search area determination unit, which determines the search area of macroblock motion vectors for macroblocks in a current image to be encoded, based on said global motion vector;

a motion vector search unit that determines said macroblock motion vector by comparing said macroblock in said current image with a block in said search area of a reference image that is referred to during encoding said current image; and an encoding/post-processing unit which encodes the macroblock together with the macroblock motion vector, and generates the reference image by decoding encoded data.

* * * * *

UNITED STATES PATENT AND TRADEMARK OFFICE
CERTIFICATE OF CORRECTION

PATENT NO. : 6,690,729 B2
DATED : February 10, 2004
INVENTOR(S) : Hayashi

It is certified that error appears in the above-identified patent and that said Letters Patent is hereby corrected as shown below:

Column 12,
Line 6, delete the word "the".
Line 10, delete the word "the" after the word "determines".
Line 10, "search area on the results" should be -- search area based on the results --.

Column 13,
Line 23, "in a T current" should be -- in a current --.
Line 56, "values contained that shape" should be -- valued contained in that shape --.

Signed and Sealed this

Eighth Day of February, 2005

JON W. DUDAS
*Director of the United States Patent and Trademark Office*